United States Patent [19]

Nagaura et al.

[11] Patent Number: 5,370,710
[45] Date of Patent: Dec. 6, 1994

[54] NONAQUEOUS ELECTROLYTE SECONDARY CELL

[75] Inventors: Toru Nagaura; Hisayuki Kato, both of Fukushima, Japan

[73] Assignee: Sony Corporation, Tokyo, Japan

[21] Appl. No.: 82,912

[22] Filed: Jun. 29, 1993

Related U.S. Application Data

[62] Division of Ser. No. 772,787, Oct. 8, 1991, abandoned.

[30] Foreign Application Priority Data

Oct. 9, 1990 [JP] Japan ................................ 2-271533

[51] Int. Cl.$^5$ ............................................. H01M 4/50
[52] U.S. Cl. .................................... 29/623.1; 205/59; 423/599
[58] Field of Search ............... 429/224; 29/623.1; 205/59; 423/599

[56] References Cited

U.S. PATENT DOCUMENTS

| | | | |
|---|---|---|---|
| 3,756,789 | 9/1973 | Alder et al. | 429/224 X |
| 4,980,251 | 12/1990 | Thackery et al. | 429/224 |
| 5,110,696 | 5/1992 | Shokoohi et al. | 423/599 X |
| 5,266,299 | 11/1993 | Tarascon | 423/599 |

FOREIGN PATENT DOCUMENTS 3-84872  6/1993  Japan .

OTHER PUBLICATIONS

Rossouw et al., *Mat. Res. Bull.*, vol. 25, pp. 173–182, 1990 "Structural Aspects of Lithium–Manganese–Oxide Electrodes for Rechargable Lithium Batteries".

*Primary Examiner*—Stephen Kalafut
*Attorney, Agent, or Firm*—Hill, Steadman & Simpson

[57] ABSTRACT

A nonaqueous electrolyte secondary cell provided with (a) a negative electrode consisting essentially of a carrier for a negative electrode active material, said carrier being capable of being doped and dedoped with lithium, (b) a positive electrode comprising, as an essential positive electrode active material, $Li_{1+x}Mn_2O_4$, wherein $x>0$, obtained by doping a lithium-manganese complex oxide with lithium and (c) a nonaqueous electrolyte. The secondary cell has an increased cell capacity as well as a high energy density and an excellent charge-discharge characteristics.

3 Claims, 6 Drawing Sheets

NONAQUEOUS ELECTROLYTE SECONDARY CELL

This is a division, of application Ser. No. 07/772,787, filed Oct. 8, 1991 now abandoned.

FIELD OF THE INVENTION

The present invention relates to a nonaqueous electrolyte secondary cell provided with (a) a negative electrode consisting essentially of a carrier for a negative electrode active material, said carrier being capable of being doped and dedoped with lithium and (b) a positive electrode comprising a lithium manganese complex oxide as an essential positive electrode active material.

BACKGROUND OF THE INVENTION

Nonaqueous electrolyte cells using lithium as a negative electrode active material and a nonaqueous solvent such as an organic solvent as an electrolyte have advantages in that self-discharge is low, a nominal potential is high and storability is very excellent.

Typical examples of such nonaqueous electrolyte cells include lithium manganese dioxide primary cells and they are widely used as current sources for clocks and memory backup of electronic instruments because of their long-term reliability.

However, conventionally used nonaqueous electrolyte cells are primary cells which can be used only once. On the other hand, with recent wide spread of video cameras and small-sized audio instruments, there has been an increased need of secondary cells which can be use for long, conveniently and economically by repeated use. For this reason the research development of nonaqueous electrolyte secondary cells has been continued.

Of nonaqueous electrolyte secondary cells, a nonaqueous secondary cell which is provided with (a) a negative electrode consisting essentially of a carbonaceous material as a carrier for a negative electrode active material, said carrier being capable of being doped and dedoped with lithium and (b) a positive electrode comprising lithium manganese complex oxide as an essential positive electrode active material, has been proposed by one of the present inventors with other inventors in Japanese Patent Application No. Hei. 1-220216. This cell has a highly expected applicability because dendrite precipitation of lithium does not occur on the surface of the negative electrode, the pulverization of lithium is inhibited, the discharge characteristics are excellent and the energy density is high.

However, a nonaqueous electrolyte secondary cell such as described above has disadvantages in that the cell capacity is prove to decrease because lithium doped into the carbonaceous material used as a negative electrode active material cannot be efficiently dedoped upon discharge.

The cause of the decrease in cell capacity is explained below by reference to FIG. 6.

FIG. 6 shows one example of a charge-discharge curve of a nonaqueous electrolyte secondary cell such as described above and illustrates the changes of the charge and discharge potentials of the negative and positive electrodes and the changes of the cell charge and discharge voltages caused by charge and discharge, respectively.

The charge and discharge of the cell in FIG. 6 are effected at the same constant current density.

In the above-described nonaqueous electrolyte secondary cell it is necessary to charge the cell just after the assembling of the cell because the carbonaceous material as a carrier for the negative electrode active material has not been doped with lithium.

During a charge, lithium is dedoped from the positive electrode active material, lithium-manganese oxide $LiMn_2O_4$ and the carbonaceous material as the carrier for the negative electrode active material is doped with the dedoped lithium.

Such reactions taking place at the positive electrode and negative electrode during a charge are shown by the following equations (1) and (2):

Positive electrode:

$$Li_{1.0}Mn_2O_4 \rightarrow Li_{1-y}Mn_2O_4 + y \cdot Li^+ + y \cdot e^- \qquad (1)$$

Negative electrode:

$$C + y \cdot Li^+ + y \cdot e^- \rightarrow Li_yC \qquad (2)$$

The change in the positive electrode charge potential during the reaction of equation (1) above is shown by the broken line in FIG. 6 and the change in the negative electrode charge potential is shown by the alternate dot and dash line in FIG. 6.

During discharge, lithium is dedoped from the negative electrode and the positive electrode is doped with the dedoped lithium.

Such reactions during discharge are shown by the following equations (3) and (4):

Negative electrode:

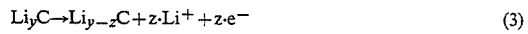
$$Li_yC \rightarrow Li_{y-z}C + z \cdot Li^+ + z \cdot e^- \qquad (3)$$

Positive electrode:

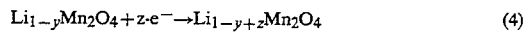
$$Li_{1-y}Mn_2O_4 + z \cdot e^- \rightarrow Li_{1-y+z}Mn_2O_4 \qquad (4)$$

The change in the negative electrode discharge potential during the reaction of equation (3) above is shown by the alternate dot and dash line in FIG. 6 and the change in the positive electrode discharge potential during the reactions of equation (4) is shown by the broken line in FIG. 6.

In equation (3) above showing the discharge reaction of the negative electrode the amount Z of lithium dedoped from the carbonaceous material used as the carrier for the negative electrode active material is smaller than the amount y of lithium with which the carbonaceous material is doped during charge in accordance with equation (2) above ($z < y$). This can easily be understood by considering that in an embodiment shown in FIG. 6 the charge period of four hours corresponds to the amount y of lithium with which the carbonaceous material of the negative electrode is doped and the discharge period of about two hours forty minutes corresponds to the amount z of lithium dedoped from the carbonaceous material of the negative material.

Therefore, the above-described nonaqueous electrolyte secondary cell has a low charge-discharge efficiency ($z/y \times 100$) at the carbonaceous material of the negative electrode and the cell capacity, which is regulated by the negative electrode becomes small.

SUMMARY OF THE INVENTION

It is an object of the present invention to provide a nonaqueous electrolyte secondary cell having an increased cell capacity which comprises a negative electrode consisting essentially of a carrier for a negative electrode active material and a positive electrode comprising a lithium manganese complex oxide as an essential positive electrode active material.

In accordance with the present invention the above object can be accomplished by a nonaqueous electrolyte secondary cell which is provided with (a) a negative electrode consisting essentially of a carrier for a negative electrode active material, said carrier being capable of being doped and dedoped with lithium, (b) a positive electrode comprising, as an essential positive electrode active material, $Li_{1+x}Mn_2O_4$, wherein $x>0$, obtained by doping a lithium manganese complex oxide with lithium and (c) a nonaqueous electrolyte.

DETAILED DESCRIPTION OF THE INVENTION

The positive electrode active material $Li_{1+x}Mn_2O_4$, wherein $x>0$, are prepared, for example, by the following methods:

(1) a method in which $LiMn_2O_4$ is electrochemically doped with lithium by effecting discharge in the presence of $LiMn_2O_4$ and lithium in an organic electrolyte solution.

(2) a method in which $LiMn_2O_4$ is chemically doped with lithium by allowing $LiMn_2O_4$ to react with a lithium compound forming agent (e.g., n-butyllithium, naphthyllithium).

The carrier for a negative electrode active material may be any material as long as it is capable of being doped and dedoped with lithium, with a carbonaceous material being preferred. Such a carbonaceous material includes pyrolysis carbons, cokes (pitch coke, needle coke, petroleum coke), graphites glassy carbons and burned products of organic high-molecular compounds, carbon fibers and active carbons.

The nonaqueous electrolyte comprising the following electrolytes dissolved in the following electrolytic solutions (nonaqueous solvents) may be used. Examples of the electrolytes include propylene carbonate, ethylene carbonate, 1,2-dimethoxyethane, 1,2-diethoxyethane, γ-butyrolactone, tetrahydrofuran, 2-methyltetrahydrofuran, 1,3-dioxolanesulfolane, diethylether and acetonitrile, which can be used singly or as a mixture of two or more electrolytic solutions. Examples of the electrolytes include $LiCl_4$, $LiAsF_6$, $LiPF_6$, $LiBF_4$, $LiB(C_6H_5)_4$, $LiCl$, $LiBr$, $CH_3SO_3Li$ and $CF_3SO_3Li$. The nonaqueous electrolyte may be solid and, for example, a solid high-molecular electrolyte.

Figure 5:
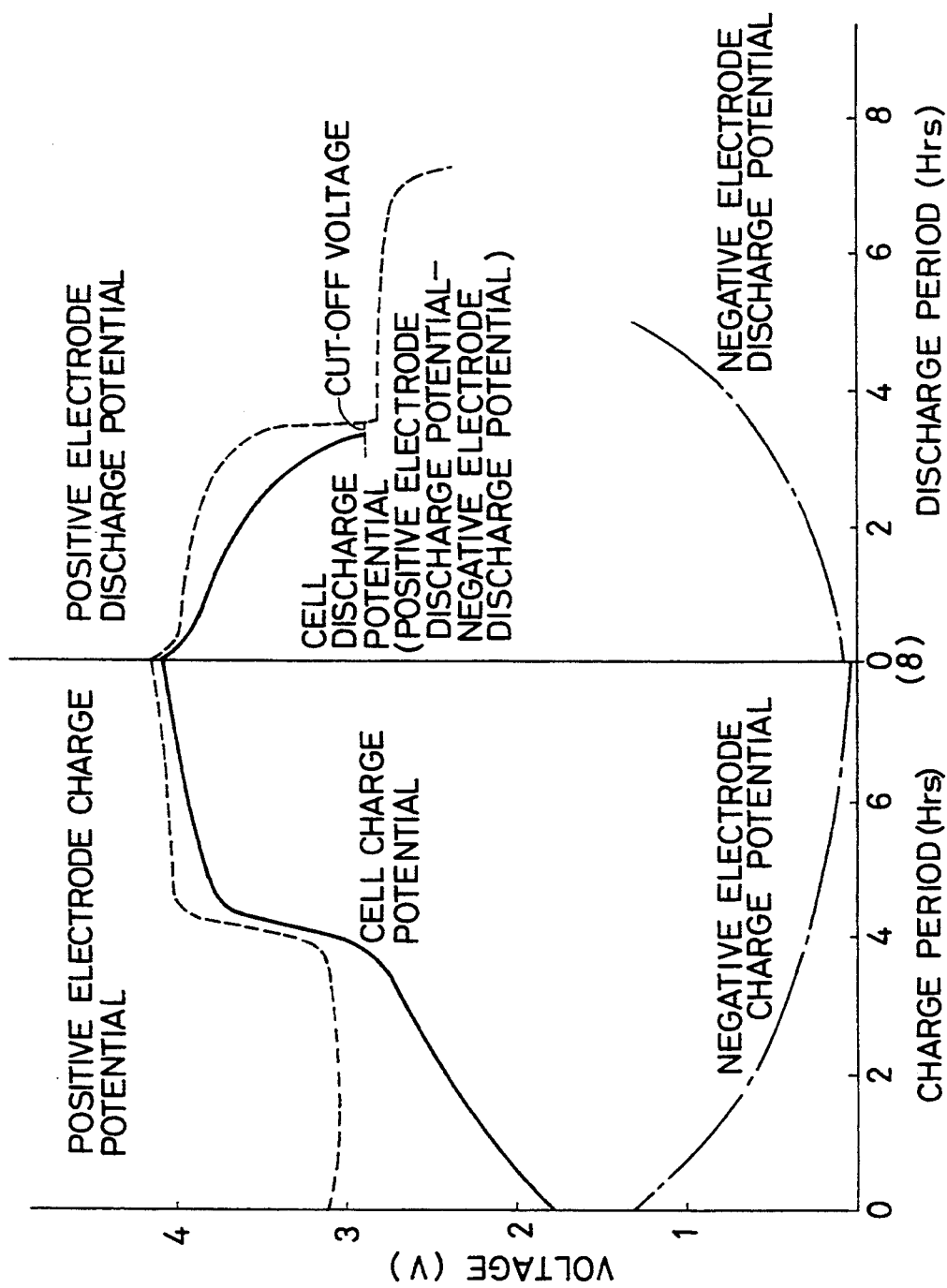
FIG. 5 shows one example of the charge-discharge curves of a nonaqueous electrolyte secondary cell of the invention using, as a positive electrode active material, $Li_{1+x}Mn_2O_4$, wherein $x=0.82$ obtained by electrochemically doping $LiMn_2O_4$ with lithium and a carbonaceous material as a carrier for a negative electrode active material.
Figure 6:
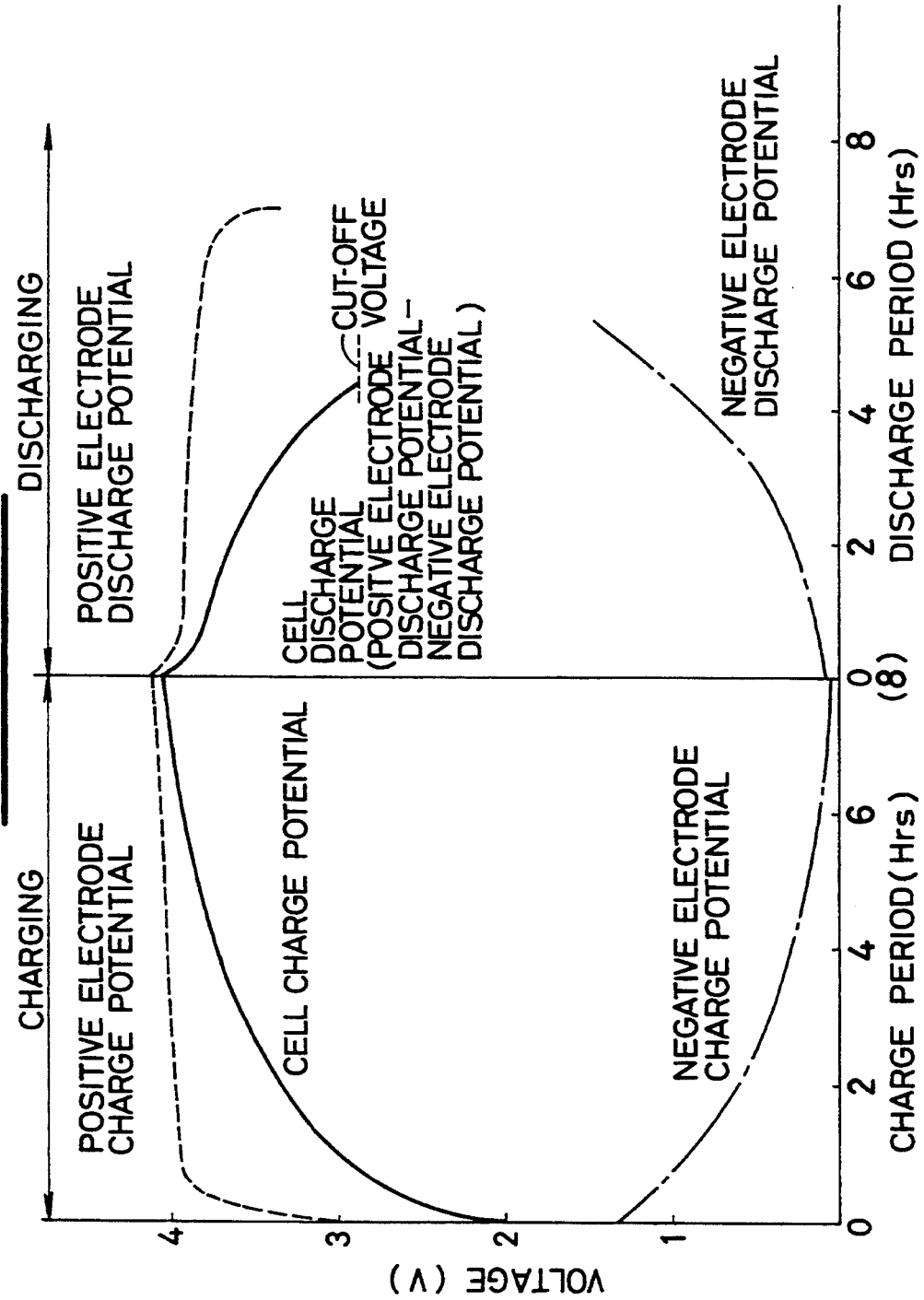
FIG. 6 shows one example of the charge-discharge curves of a conventional nonaqueous electrolyte secondary cell using $LiMn_2O_4$ as a positive electrode active material and a carbonaceous material as a carrier for a negative electrode active material.

In FIG. 5 one example of the charge-discharge curves of a nonaqueous electrolyte secondary cell in which a positive electrode active material is $Li_{1+x}Mn_2O_4$, wherein $x=0.82$, obtained by electrochemically doping $LiMn_2O_4$ with lithium and a carrier for a negative electrode active material is a carbonaceous material, are shown. FIG. 5 corresponds to FIG. 6 showing the case of a prior art with a different scale of the abscissa (time).

When such a nonaqueous electrolyte secondary cell is charged, x·Li is dedoped from the positive electrode active material $Li_{1+x}Mn_2O_4$ at about 3.0 V of the positive electrode charge potential (with lithium being a reference electrode; shown by the broken line in FIG. 5). When charging is continued, lithium is dedoped at about 4.0 V of the positive electrode charge potential and doped into the carbonaceous material of the negative electrode.

Thereafter, when the cell is discharged, the positive electrode is first doped with lithium at about 4.0 V of the positive electrode discharge potential and lithium is dedoped from the negative electrode. At this time, since the amount of lithium which can be dedoped from the negative electrode is larger than the amount of lithium with which the positive electrode can be doped at 4.0 V of the positive electrode discharge potential, the electrode can still afford a sufficient discharge.

Therefore, as compared with the conventional cell in which the capacity is regulated by the electrode, the capacity of the nonaqueous electrolyte secondary cell of the present invention is regulated by the positive electrode and thus the utilization factor of the positive electrode is increased and the cell capacity is increased.

The present invention is described in greater detail by means of illustrative examples with reference to FIG. 1 to FIG. 4.

The positive electrode active material $Li_{1+x}Mn_2O_4$ were prepared by the following two method.

Preparation Example 1 of Positive Electrode Active Material (Electrochemical Method)

A mixture of 1 mol of manganese dioxide and 0.25 mol of lithium carbonate was burned at 850° C. for 5 hours in the air to synthesize $LiMn_2O_4$.

To 86 parts by weight of the $LiMn_2O_4$ were added 10 parts by weight of graphite as a conductive agent and 4 parts by weight of polyvinilidene fluoride as a binder. They are mixed to obtain a positive electrode mixture. The positive electrode mixture was dispersed in the solvent N-methylpyrrolidone to prepare a slurry of the positive electrode mixture. The slurry of the positive electrode mixture was uniformly applied on both sides of a strip of an aluminum foil and, after drying, compression-molded to form a strip positive electrode.

A strip of negative electrode was formed with a strip metal lithium.

The strip positive and negative electrodes were laminated with a pair of strip separators interposed and coiled to form a coiled electrode element. The coiled electrode element was used to make a cylindrical nonaqueous electrolyte secondary cell having a diameter of 13.8 mm and a height of 42 mm. The cell may be constructed as shown in Example 1 described hereinafter.

The above secondary cell was discharged up to 2.8 V with a current density of 0.2 mA/cm$^2$ to dope the positive electrode active material $LiMn_2O_4$ with lithium, thereby obtaining $Li_{1+x}Mn_2O_4$. The value of x in $Li_{1+x}Mn_2O_4$ was determined by atomic absorption spectrophotometry to be 0.19.

Similarly, the above secondary cell was discharged up to 2.7 V, 2.6 V, 2.0 V and 1.5 V to obtain $Li_{1+x}Mn_2O_4$, wherein x were 0.40, 0.62, 0.82 and 0.95, respectively.

Figure 2:
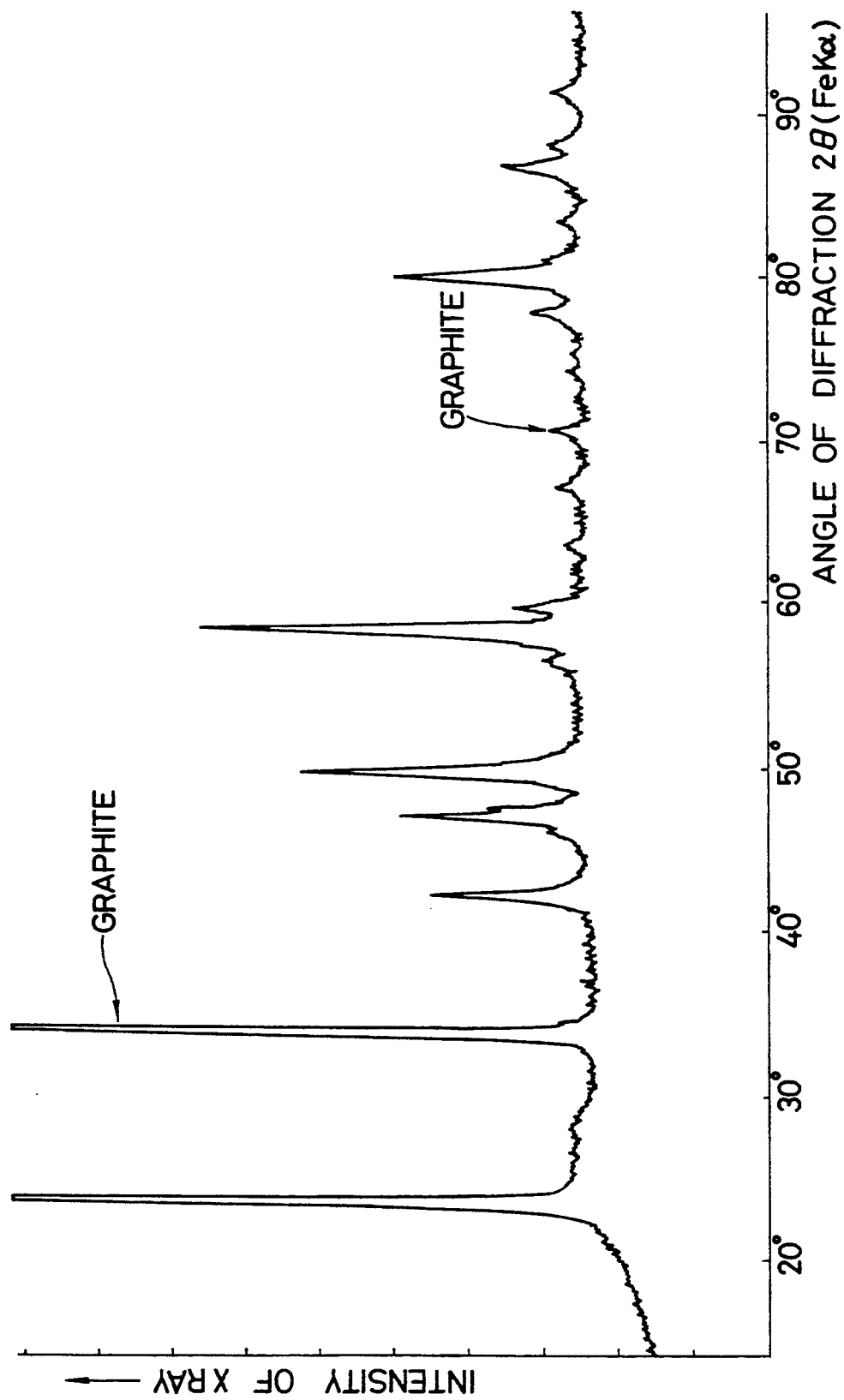
FIG. 2 shows an X-ray diffraction pattern by FeKα ray of $Li_{1+x}Mn_2O_4$, wherein $x=0.82$, obtained in Preparation Example 1 of a positive electrode active material of an embodiment of the invention.

The X-ray diffraction pattern of $Li_{1+x}Mn_2O_4$, wherein x=0.82, by FeK$\alpha$ ray in shown in FIG. 2. In FIG. 2 two peaks indicated by an arrow as "graphite" are due to the presence of graphite in the above $Li_{1+x}Mn_2O_4$.

Figure 4:
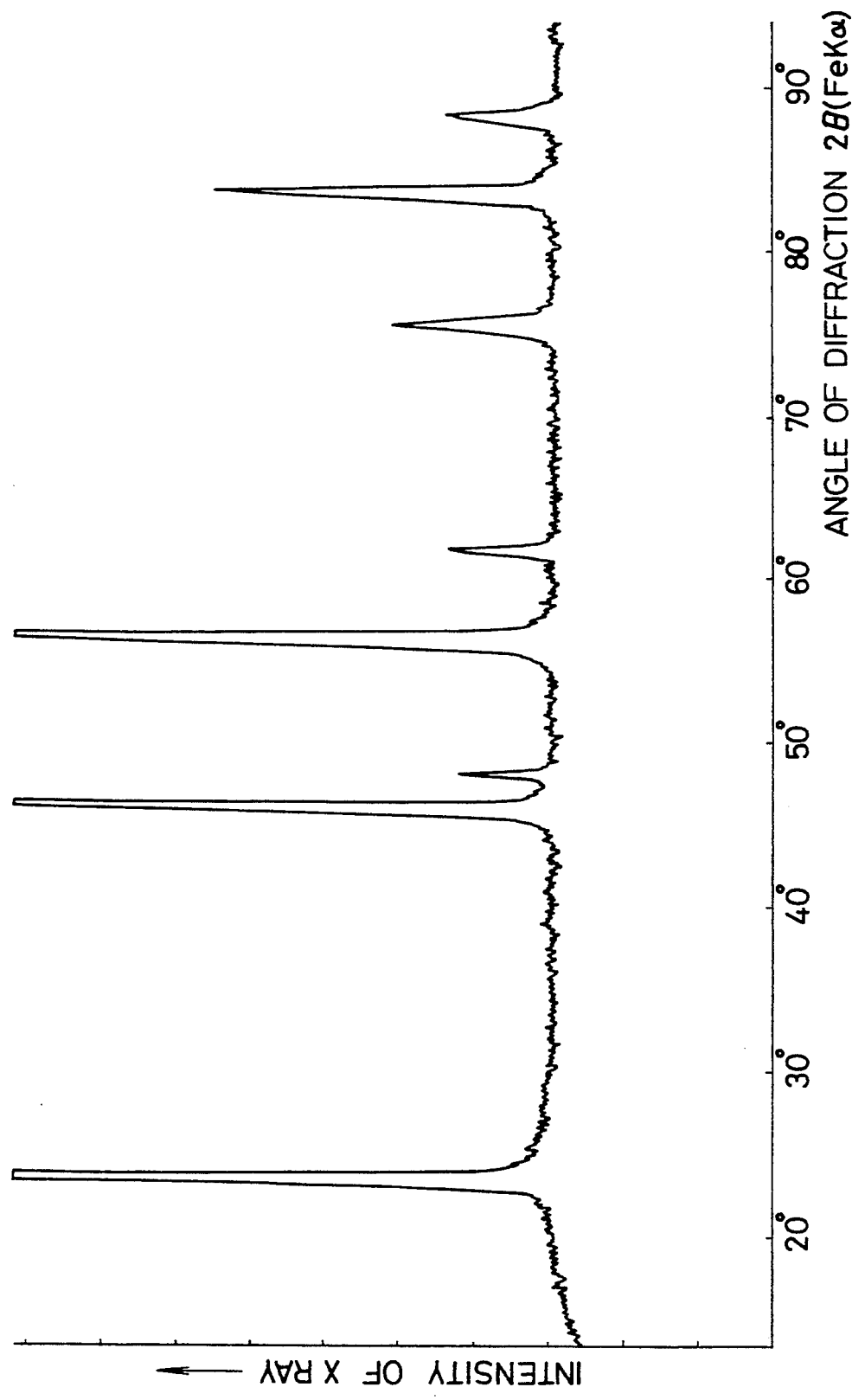
FIG. 4 shows an X-ray diffraction pattern by FeKα ray of conventional $LiMn_2O_4$.

For comparison, the X-ray diffraction pattern of $LiMn_2O_4$ by FeK$\alpha$ ray is shown in FIG. 4. The X-ray diffraction pattern of $Li_{1+x}Mn_2O_4$ shown in FIG. 2 clearly differs from that of $LiMn_2O_4$ shown in FIG. 4. From this it is assumed that the crystalline states of the two cases are different.

Preparation Example 2 of Positive Electrode Active Material (Chemical Method)

100 g of $LiMn_2O_4$ and 360 ml of a 15% solution of n-butyllithium in hexane were allowed to react for several hours in 100 ml of hexane. The resulting solution was filtered and then subjected to vacuum drying at 120° C. for 24 hours to obtain $Li_{1+x}Mn_2O_4$. The value of x in the $Li_{1+x}Mn_2O_4$ was determined by atomic absorption spectrophotometry to be 1.02.

Figure 3:
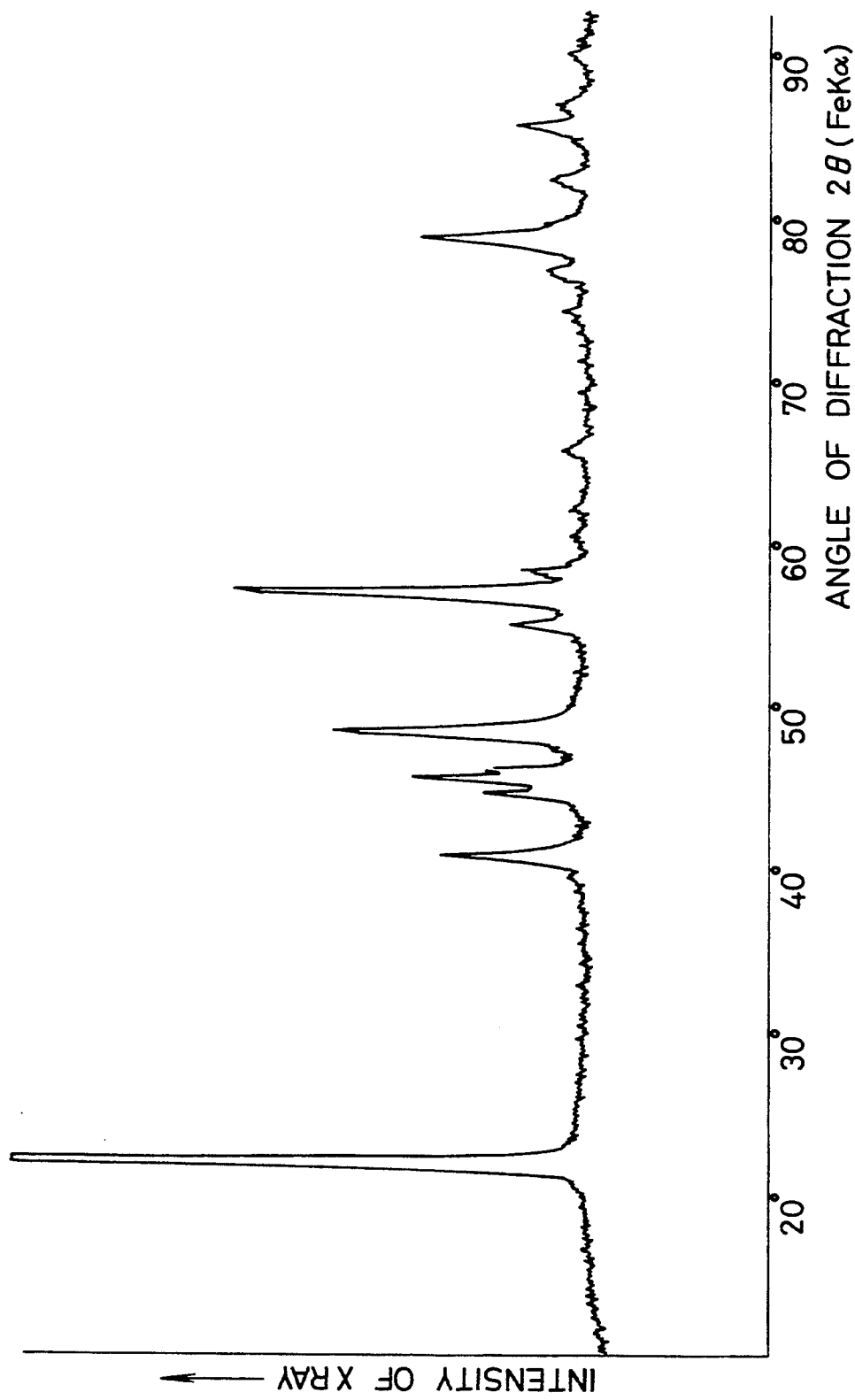
FIG. 3 shows an X-ray diffraction pattern by FeKα ray of $Li_{1+x}Mn_2O_4$, wherein $x=1.02$, obtained by Preparation Example 2 of a positive electrode active material of an embodiment of the invention.

The X-ray diffraction pattern of this $Li_{1+x}Mn_2O_4$ by FeK$\alpha$ ray is shown in FIG. 3. Since this diffraction pattern clearly differs from the diffraction pattern of $LiMn_2O_4$ shown in FIG. 4, it is assumed that the crystalline states of the two cases are different.

Example 1

Figure 1:
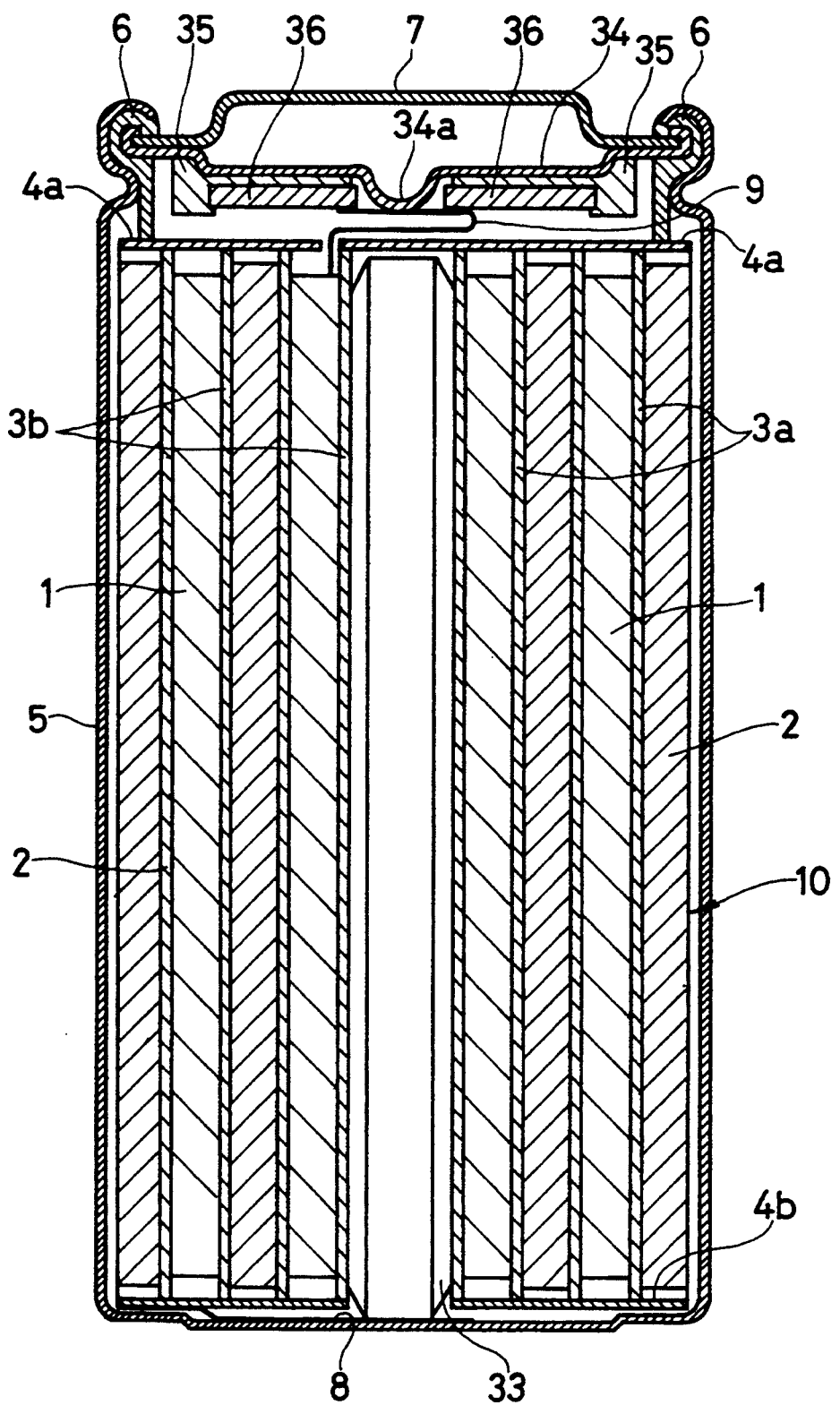
FIG. 1 is a schematic vertical sectional view of a cylindrical nonaqueous electrolyte secondary cell of an embodiment of the invention.

FIG. 1 is a schematic vertical sectional view of a nonaqueous electrolyte secondary cell according an embodiment of the present invention. This cell was prepared as follows.

A positive electrode 1 used is the strip positive electrode which was removed from the cell prepared in Preparation Example 1 of Positive Electrode described above. The positive electrode active material was $Li_{1+x}Mn_2O_4$, wherein x=0.19.

In order to prepare a negative electrode 2, 90 parts by weight of pulverized pitch cokes were mixed with 10 parts by weight of polyvinilidene fluoride as a binder to obtain a negative electrode mixture. The negative electrode mixture was dispersed in the solvent N-methylpyrrolidone to prepare a slurry of the negative electrode mixture. The slurry of the negative electrode mixture was uniformly coated on both sides of a strip of copper foil and, after drying, compression-molded with a roller press to obtain a strip negative electrode 2.

The strip positive electrode 1 and negative electrode 2 were laminated with a pair of strip separators 3a and 3b of microporous polypropylene interposed. The laminate was wound on a core 33 with a number of turns in the form of a roll to prepare a swirl-type coiled electrode element 10.

An insulating board 4b was placed at the bottom of a nickel-plated iron cell can 5 and the above coiled electrode 10 was put in the cell can 5. For current collection of the negative electrode 2, one and of a negative electrode lead 8 of nickel was fixed by contact bonding to the negative electrode 2 and the other end of the lead 8 was welded to the cell can 5. For current collection of the positive electrode 1, one end of a positive electrode lead 9 of aluminum was fixed by contact bonding to the positive electrode 2 and the other end of the lead 9 was welded to a projection 34a of a metallic safety valve 34.

The cell can 5 was charged with a nonaqueous electrolytic solution prepared by mixing propylene carbonate containing $LiPF_6$ dissolved in a concentration of 1 mol/l and 1,2-dimethoxyethane. Thereafter, the insulating board 4a was placed so as to cover the upper side of the coiled electrode element 10. The cell can 5 was then sealed by caulking through an insulating gasket 6, the cell can 5, the safety valve 34 and a metallic cell cover 7, the outer peripheries of which are in close contact to each other.

By so caulking, the lower end in FIG. 1 of the gasket 6 abuts the outer peripheral face of the insulating board 4a and thus the insulating board 4a comes in close contact with the upper end of the coiled electrode element 10.

In the manner described above a cylindrical nonaqueous electrolyte secondary cell having a diameter 13.8 mm and a height of 42 mm was prepared. This cell is designated cell A, for convenience, as indicated in Table 1 below.

The above cylindrical nonaqueous electrolyte secondary cell in provided with the safety valve 34, a spacer 36 and an intermediate insertion member of an insulating material 35 for integrating the safety valve 34 and the spacer 36, to form a double safety structure. The safety valve 34 has a rupturable portion (not shown) which can rupture upon deformation of the safety valve and the cell cover 7 has a hole (not shown). If the pressure in the cell should increase for some cause, the safety valve 34 deforms upward in FIG. 1 around the projection 34a to break the connection the positive electrode lead 9 and the projection 34a, thereby cut the cell current or the rupturable portion ruptures to evacuate the gas generated in the cell.

Cells B, C, D and E were prepared in the same manner as for cell A but using the positive electrode active materials $Li_{1+x}Mn_2O_4$, wherein x=0.40, 0.62, 0.82 and 0.95, respectively, prepared in Preparation Example 1 described above.

Example 2

Cylindrical nonaqueous electrolyte secondary cell F was prepared in the same manner as in Example 1 but using the positive electrode active material $Li_{1+x}Mn_2O_4$, wherein x=1.02, prepared in Preparation Example 2 of Positive Electrode Active Material described above.

Comparison Example

For comparison to confirm the effect of the present invention cylindrical nonaqueous electrolyte secondary cell G was prepared in the same manner as in Example 1 but using the positive electrode active material $LiMn_2O_4$.

Cells A to G were subjected to a constant-current charge for nine hours at a charge current of 80 mA with an upper limit voltage of 4.0 V and were then discharged up to a final voltage (cut-off voltage) of 2.9 V with a constant-resistance load of 14 Ω, this charge-discharge cycle being repeated.

The cell capacities (mAh) at the tenth cycle at which the cell capacity became constant were shown in Table 1 below.

TABLE 1

| Cell | Capacity at the 10th cycle (mAh) | x in $Li_{1+x}Mn_2O_4$ |
| --- | --- | --- |
| A | 407 | 0.19 |
| B | 455 | 0.40 |
| C | 500 | 0.62 |
| D | 498 | 0.82 |
| E | 484 | 0.95 |
| F | 465 | 1.02 |
| G(Comparison) | 342 | 0 |

The results of Table 1 indicate that the cell capacity is increased as the value of x in the positive electrode $Li_{1+x}Mn_2O_4$ is increased from 0.19 to 0.62 and the cell capacity is slightly decreased when x is increased to 1.02. However, any one of cells A to F has the cell capacity about 20% higher than that of conventional cell G (comparison) using the positive electrode active material $LiMn_2O_4$ which is not doped with lithium. It can be seen that in order to obtain the increased effect of the cell capacity preferably x in $Li_{1+x}Mn_2O_4$ is at least 0.19, more preferably in the range of 0.40 to 1.02.

In cells A to F according to the embodiments of the present invention it is considered that the cell capacity is increased due to the improved utilization factor of the positive electrode because the low charge-discharge efficiency of the carbonaceous material which is the carrier for the negative electrode active material is compensated with x lithium in $Li_{1+x}Mn_2O_4$ obtained by doping $LiMn_2O_4$ with lithium.

The methods of preparing $Li_{1+x}Mn_2O_4$ by doping lithium-manganese complex oxide with lithium include electrochemical and chemical methods as described above. However, the cell capacity could be increased using $Li_{1+x}Mn_2O_4$ obtained by both methods.

In the present Examples 1 and 2 the cylindrical secondary cell using the coiled electrode element has been shown but the present invention is not construed as being limited thereto. The nonaqueous electrolyte secondary cell of the present invention may be of rectangular pipe type, button type or coin type.

According to the present invention the nonaqueous electrolyte secondary cell comprises a negative electrode consisting essentially of a carrier such as a carbonaceous material for a negative electrode active material, said carrier being capable of being doped and dedoped with lithium and a positive electrode comprising a lithium-manganese complex oxide as an essential positive electrode active material, wherein the essential position electrode active material is $Li_{1+x}Mn_2O_4$ obtained by doping the lithium-manganese complex oxide with lithium, thereby providing a high capacity in addition to the conventionally known characteristics of high energy density and excellent charge-discharge ability.

What is claimed is:

1. A method for manufacturing a nonaqueous electrolyte secondary cell comprising the steps of:
    a) providing $LiMn_2O_4$;
    b) doping the $LiMn_2O_4$ with lithium to produce a positive electrode active material of $Li_{1+x}Mn_2O_4$ wherein x>0; and
    c) combining the positive electrode material with a negative electrode active material and a nonaqueous electrolyte to form the nonaqueous electrolyte secondary cell.

2. A method according to claim 1, wherein the step of doping comprises chemical doping by reacting the $LiMn_2O_4$ material with a lithium compound forming agent.

3. A method according to claim 1, wherein the step of doping comprises an electrochemical doping by placing the $LiMn_2O_4$ in the presence of an organic electrolyte solution containing lithium and creating a discharge.

* * * * *